United States Patent
Ishida et al.

(10) Patent No.: US 12,258,276 B2
(45) Date of Patent: Mar. 25, 2025

(54) CARBONACEOUS MATERIAL, METHOD FOR PRODUCING SAME, FILTER FOR WATER PURIFICATION AND WATER PURIFIER

(71) Applicant: KURARAY CO., LTD., Kurashiki (JP)

(72) Inventors: Shuichi Ishida, Okayama (JP); Tetsuya Hanamoto, Okayama (JP); Hiroe Yoshinobu, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 674 days.

(21) Appl. No.: 17/605,392

(22) PCT Filed: Apr. 22, 2020

(86) PCT No.: PCT/JP2020/017383
§ 371 (c)(1),
(2) Date: Oct. 21, 2021

(87) PCT Pub. No.: WO2020/218370
PCT Pub. Date: Oct. 29, 2020

(65) Prior Publication Data
US 2022/0242737 A1    Aug. 4, 2022

(30) Foreign Application Priority Data
Apr. 26, 2019 (JP) .................. 2019-085514

(51) Int. Cl.
*C01B 32/30* (2017.01)
*B01D 39/20* (2006.01)
(Continued)

(52) U.S. Cl.
CPC .......... *C01B 32/30* (2017.08); *B01D 39/2062* (2013.01); *B01J 20/20* (2013.01);
(Continued)

(58) Field of Classification Search
CPC ....... C01B 32/30; C01B 32/336; C01B 32/05; C01B 32/312; B01D 39/2062;
(Continued)

(56) References Cited

U.S. PATENT DOCUMENTS

| | | | |
|---|---|---|---|
| 4,576,929 | A | 3/1986 | Shimazaki |
| 4,696,742 | A | 9/1987 | Shimazaki |

(Continued)

FOREIGN PATENT DOCUMENTS

| | | |
|---|---|---|
| JP | S60-137811 A | 7/1985 |
| JP | H07-60246 A | 3/1995 |

(Continued)

OTHER PUBLICATIONS

Notice of Opposition issued on Sep. 17, 2021 in Japanese Patent No. 6829796, Opposition No. Igi 2021-700790-01 (Year: 2021).*

(Continued)

*Primary Examiner* — Daniel C. McCracken
(74) *Attorney, Agent, or Firm* — Element IP, PLC

(57) ABSTRACT

One aspect of the present invention relates to a carbonaceous material which has a benzene adsorption of 25 to 40% and a vitamin B12 adsorption of 13.0 to 50.0 mg/g, while having a pore volume of mesopores of 0.070 to 0.150 $cm^3/g$ as calculated from a nitrogen adsorption isotherm by means of a BJH method.

20 Claims, 2 Drawing Sheets

(51) Int. Cl.
  *B01J 20/20* (2006.01)
  *B01J 20/28* (2006.01)
  *B01J 20/30* (2006.01)
  *C01B 32/336* (2017.01)
  *C02F 1/28* (2023.01)

(52) U.S. Cl.
  CPC ..... *B01J 20/28057* (2013.01); *B01J 20/2808* (2013.01); *B01J 20/3078* (2013.01); *C01B 32/336* (2017.08); *C02F 1/28* (2013.01); *C01P 2006/12* (2013.01); *C01P 2006/14* (2013.01); *C01P 2006/16* (2013.01)

(58) Field of Classification Search
  CPC .... B01D 2239/0407; B01D 2239/0442; B01D 2239/065; B01D 2239/1241; B01D 39/1615; B01D 39/163; B01D 35/00; B01D 39/2055; B01J 20/20; B01J 20/28057; B01J 20/2808; B01J 20/3078; B01J 20/30; B01J 20/28; B01J 20/28064; B01J 20/28066; B01J 20/28071; C02F 1/28; C02F 2101/322; C02F 1/283; C01P 2006/12; C01P 2006/14; C01P 2006/16
  See application file for complete search history.

(56) References Cited

U.S. PATENT DOCUMENTS

| | | |
|---|---|---|
| 2013/0023405 A1 | 1/2013 | Hitomi et al. |
| 2014/0231342 A1 | 8/2014 | Yamanoi et al. |
| 2015/0287545 A1 | 10/2015 | Ogawa et al. |
| 2017/0209848 A1 | 7/2017 | Takenaka et al. |
| 2019/0291073 A1 | 9/2019 | Hanamoto et al. |
| 2020/0317537 A1 | 10/2020 | Yamanoi et al. |

FOREIGN PATENT DOCUMENTS

| | | | |
|---|---|---|---|
| JP | H08-52347 A | 2/1996 | |
| JP | H10-297912 A | 11/1998 | |
| JP | H11240707 A | 9/1999 | |
| JP | 2002012417 A | 1/2002 | |
| JP | 2003290654 A | 10/2003 | |
| JP | 2003292317 A | 10/2003 | |
| JP | 2003334543 A | 11/2003 | |
| JP | 2004010436 A | 1/2004 | |
| JP | 2005013883 A | 1/2005 | |
| JP | 2006282441 A | 10/2006 | |
| JP | 2008088054 A | 4/2008 | |
| JP | 2008149267 A | 7/2008 | |
| JP | 2011045853 A | 3/2011 | |
| JP | 2011255310 A | 12/2011 | |
| JP | 2012179589 A | 9/2012 | |
| JP | 2013220413 A | 10/2013 | |
| JP | 2016030697 A | 3/2016 | |
| JP | 2017164741 A | 9/2017 | |
| JP | 6829796 * | 2/2021 | ............. B01J 20/20 |
| WO | WO-03026792 A1 | 4/2003 | |
| WO | WO-2016080241 A1 | 5/2016 | |
| WO | WO-2017199717 A1 | 11/2017 | |

OTHER PUBLICATIONS

W80050US Opposition 1/Kou-1—Translation of Opposition 1 / Kou-1 "Report of Measurement Result" prepared by the Opponent (Year: 2021).*
"Wako Analytical Circle", Wako Pure Chemical Industries, Ltd., No. 20, Mar. 2001, pp. 1-16, (with partial English translation).
"Catalog of CW830S" (Granular Activated Carbon), Futamura Chemical Co., Ltd., Nov. 15, 2018, 1 page (with partial English translation).
"Catalog of Taiko CT Type", Futamura Chemical Co., Ltd.,, Nov. 26, 2007, 2 pages (with partial English translation).
"General Catalog of Activated Carbon", Japan EnviroChemicals, Ltd. (Current Osaka Gas Chemicals, Co., Ltd.), Jul. 2014, 12 pages (with partial English translation).
"Report of Measurement Result", prepared by the opponent-Nami GOTO, Aug. 4, 2021, 1 page (with English translation).
Catalog of FILTRASORB ® F400, Calgon Carbon Corporation, obtained from the following web site: https://d3pcsg2wjq9izr.cloudfront.net/files/3463/download/410784/25_Filtrasorb_400_1019web.pdf, 2012, 3 pages.
Harty Marsh et al, "Applicability of Activated Carbon", Activated Carbon, Chapter 8, Elsevier Ltd., 2006, p. 383-453.
Hisashi Tamai et al, "Synthesis of Extremely Large Mesoporous Activated Carbon and Its Unique Absorption for Giant Molecules", Chem. Mater., 1996, vol. 8, No. 2, p. 454-462.
Notice of Opposition issued on Sep. 17, 2021 in Japanese Patent No. 6829796, Opposition No. Igi 2021-700790-01 (with partial English translation), 14 pages.
Notice of Opposition issued on Sep. 17, 2021 in Japanese Patent No. 6829796, Opposition No. Igi 2021-700790-02 (with partial English translation), 22 pages.
Shigeaki Kasaoka et al, "Preparation of Activated Fibrous Carbon from Phenolic Fabric and Its Molecular Sieving Properties", Nippon Kagaku Kaishi, 1987, (6), p. 990-1000 (with partial English translation).
Combined Taiwanese Office Action and Search Report issued May 31, 2021 in Patent Application No. 109113766, 3 pages (with English translation of Categories).
International Search Report issued Jun. 23, 2020 in PCT/JP2020/017383, 2 pages.

* cited by examiner

CARBONACEOUS MATERIAL, METHOD FOR PRODUCING SAME, FILTER FOR WATER PURIFICATION AND WATER PURIFIER

TECHNICAL FIELD

The present invention relates to a carbonaceous material. The present invention further relates to a method for producing a carbonaceous material, a filter for water purification using the carbonaceous material, and a water purifier.

BACKGROUND ART

In recent years, safety and hygienic concerns have increased with regard to water quality of tap water, and it is desired to remove harmful substances such as free residual chlorine contained in tap water, VOC (volatile organic compound) such as trihalomethanes, pesticides typified by 2-chloro-4,6-bisethylamino-1,3,5-triazine (CAT), and musty odor typified by 2-methylisobomeol (2-MIB).

In the Household Goods Quality Labeling Act, 13 removal target substances, i.e., free residual chlorine, turbidity, chloroform, bromodichloromethane, dibromochloromethane, bromoform, tetrachloroethylene, trichloroethylene, 1,1,1-trichloroethane, total trihalomethane (THM), CAT, 2-MIB (2-methylisoborneol), and soluble lead, are specified for water purifiers.

Various techniques for removing these removal target substances using a carbonaceous material have been proposed. For example, Patent Literature 1 discloses a technique for removing a musty odor substance by a combination of granular activated carbon and fibrous activated carbon. Patent Literature 2 discloses a technique for removing each removal target substance by a combination of fibrous activated carbon and an inorganic adsorbent. Patent Literatures 3 to 5 also propose a technique for removing a removal target substance using activated carbon having a specific surface structure.

Among removal target substances, substances other than turbidity and soluble lead can be removed using activated carbon; however, it has been difficult to efficiently remove both of 2-MIB having a large molecular size and VOC such as trihalomethane having a small molecular size by a single species of activated carbon. An ability to remove harmful substances required for water purifiers is increasing year by year, and activated carbon capable of removing both trihalomethane and 2-MIB by a single species is required.

An object of the present invention is to provide a carbonaceous material capable of removing both trihalomethane and 2-MIB by a single species.

CITATION LIST

Patent Literature

Patent Literature 1: JP 8-52347 A
Patent Literature 2: JP 2003-334543 A
Patent Literature 3: JP 2003-290654 A
Patent Literature 4: JP 2013-220413 A
Patent Literature 5: JP 2006-282441 A

SUMMARY OF INVENTION

As a result of intensive studies to solve the above problems, the present inventors have found that the above problems can be solved by a carbonaceous material having the following configuration, and based on such findings, the inventors have conducted further investigations, in the course of which they have ultimately arrived at the present invention.

That is, the carbonaceous material according to one aspect of the present invention has a benzene adsorption of 25 to 40%, a vitamin B12 adsorption of 13.0 to 50.0 mg/g, and a pore volume of mesopores of 0.070 to 0.150 $cm^3/g$ as calculated from a nitrogen adsorption isotherm by means of a BJH method.

A method for producing a carbonaceous material according to another aspect of the present invention is a method for producing a carbonaceous material using a fluidized bed furnace, in which separately from a fluidized gas introduced from a furnace bottom, an oxygen-containing gas is introduced into the fluidized bed furnace so that an oxygen concentration in a gas obtained by adding the fluidized gas and the oxygen-containing gas is 0.004 to 1 vol %.

DESCRIPTION OF EMBODIMENTS

Figure 1:
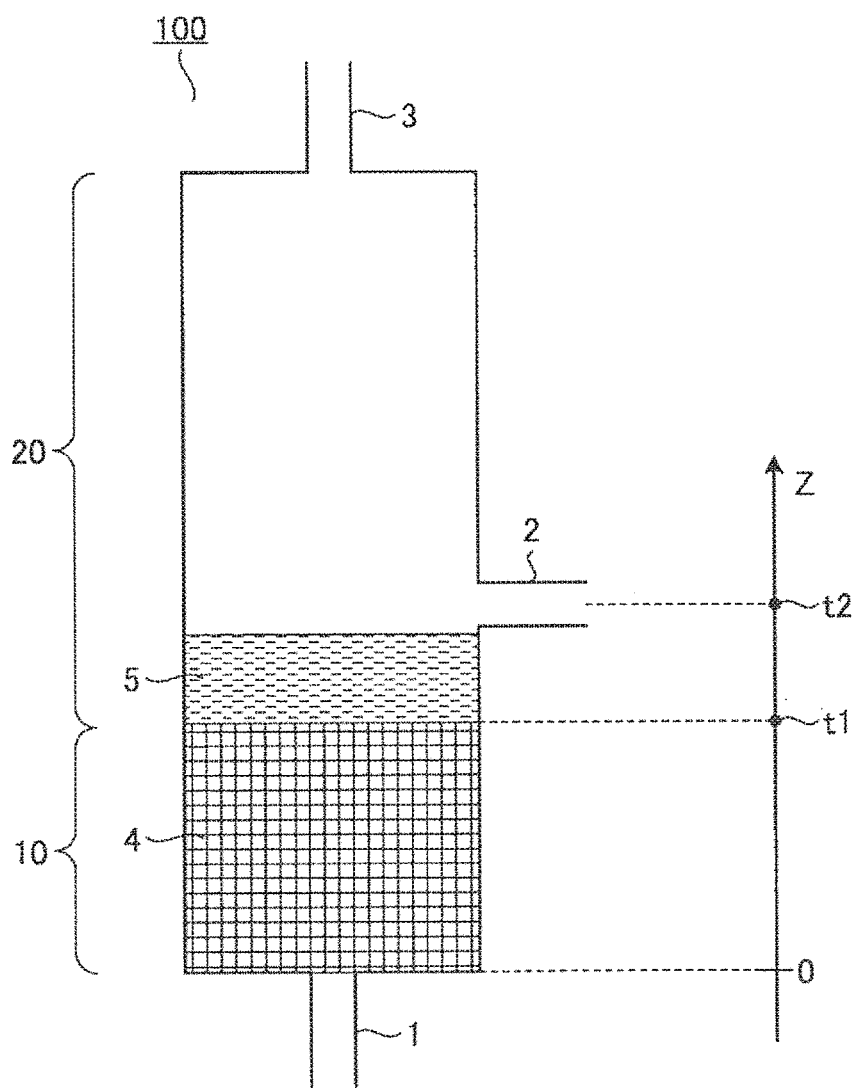
FIG. 1 is a schematic view for describing a method for producing a carbonaceous material using a fluidized bed furnace in an embodiment of the present invention.

Hereinafter, an embodiment according to the present invention will be described specifically, but the present invention is not limited to this embodiment.

[Carbonaceous Material]

A carbonaceous material according to one embodiment of the present invention has a benzene adsorption of 25 to 40% and a vitamin B12 adsorption of 13.0 to 50.0 mg/g, while having a pore volume of mesopores of 0.070 to 0.150 $cm^3/g$ as calculated from a nitrogen adsorption isotherm by means of a BJH method.

According to the above configuration, it is possible to provide a carbonaceous material capable of removing both trihalomethane and 2-MIB by a single species.

As described above, among the 13 removal target substances specified in the Household Goods Quality Labeling Act, substances other than turbidity and soluble lead can be removed using a carbonaceous material such as activated carbon. However, it has been difficult to efficiently remove both of 2-MIB having a large molecular size and VOC such as trihalomethane having a small molecular size by a single species. On the other hand, in the carbonaceous material according to one embodiment of the present invention in which the benzene adsorption, the vitamin B12 adsorption, and the mesopore volume are in the above-mentioned specific ranges, 2-MIB having a large molecular size and VOC such as trihalomethane having a small molecular size can be efficiently removed by a single species.

(Benzene Adsorption)

The benzene adsorption is an index indicating a degree of progress of activation of the carbonaceous material. In general, carbonaceous materials having micropores developed tend to be suitable for adsorbing trihalomethane having a small molecular size. The carbonaceous material according to the present embodiment has a benzene adsorption in a range of 25 to 40%, and has excellent trihalomethane adsorption performance.

From the viewpoint of achieving excellent trihalomethane adsorption performance, the benzene adsorption of the carbonaceous material is in a range of 25 to 40%, the upper limit is preferably 39% or less, 38% or less, 37% or less, 36% or less, or 35% or less, and the lower limit is preferably 26% or more, 27% or more, 28% or more, 29% or more, or 30% or more.

The benzene adsorption of the carbonaceous material can be measured by a method described in [Measurement of benzene adsorption] described later.

(Vitamin B12 Adsorption)

Vitamin B12 (cyanocobalamin) has a large molecular weight of about 1355, and the vitamin B12 adsorption is an index of adsorption characteristics for substances having a large molecular size. The carbonaceous material according to the present embodiment has a vitamin B12 adsorption of 13.0 mg/g or more, and exhibits excellent adsorption performance for 2-MIB having a large molecular size.

From the viewpoint of achieving excellent 2-MIB adsorption performance, the vitamin B12 adsorption of the carbonaceous material is 13.0 mg/g or more, preferably 15.0 mg/g or more, more preferably 16.0 mg/g or more, 17.0 mg/g or more, 18.0 mg/g or more, 19.0 mg/g or more, or 20.0 mg/g or more. The upper limit of the vitamin B12 adsorption is not particularly limited, and is usually 50.0 mg/g or less, and preferably 48.0 mg/g or less, 46.0 mg/g or less, 45.0 mg/g or less, 44.0 mg/g or less, 43.0 mg/g or less, 42.0 mg/g or less, 41.0 mg/g or less, or 40.0 mg/g or less from the balance with other physical property values such as the benzene adsorption.

The vitamin B12 adsorption of the carbonaceous material can be measured by a method described in [Measurement of vitamin B12 adsorption] described later.

(Mesopore Volume)

The pores of the carbonaceous material can be classified into micropores (diameter: less than 2 nm), mesopores (diameter: 2 to 50 nm), and macropores (diameter: more than 50 nm) according to their diameters (parentheses indicate IUPAC classification criteria). The mesopores are larger than the micropores, and the volume of the mesopores can be mainly an index of the adsorption characteristics of 2-MIB having a large molecular size. The carbonaceous material according to the present embodiment has a mesopore volume in the range of 0.070 to 0.150 cm$^3$/g, and has excellent adsorption performance for 2-MIB having a large molecular size.

From the viewpoint of achieving excellent 2-MIB adsorption performance while maintaining adsorption characteristics for trihalomethane, the mesopore volume of the carbonaceous material is in the range of 0.070 to 0.150 cm$^3$/g, and the lower limit is preferably 0.072 cm$^3$/g or more, 0.074 cm$^3$/g or more, 0.075 cm$^3$/g or more, 0.076 cm$^3$/g or more, 0.077 cm$^3$/g or more, 0.078 cm$^3$/g or more, 0.079 cm$^3$/g or more, or 0.080 cm$^3$/g or more. The upper limit is preferably 0.148 cm$^3$/g or less, 0.146 cm$^3$/g or less, 0.145 cm$^3$/g or less, 0.144 cm$^3$/g or less, 0.143 cm$^3$/g or less, 0.142 cm$^3$/g or less, 0.141 cm$^3$/g or less, or 0.140 cm$^3$/g or less.

The mesopore volume of the carbonaceous material can be calculated from the nitrogen adsorption isotherm using the BJH (Barrett-Joyner-Halenda) method. The measurement of the nitrogen adsorption isotherm and the calculation of the mesopore volume can be performed by methods described in [Measurement of nitrogen adsorption isotherm] and [Measurement of pore volume of mesopores by BJH method] described later.

Although the technical significance of each of the benzene adsorption, the vitamin B12 adsorption, and the mesopore volume in the present invention has been described above, a relationship between the structure of the carbonaceous material (adsorption medium) and the adsorption characteristics for an adsorbate is complicated, and the benzene adsorption, the vitamin B12 adsorption, and the mesopore volume may not be separately and independently correlated immediately with the adsorption characteristics for the adsorbate. It should be noted that in order to achieve a carbonaceous material capable of efficiently removing trihalomethane and 2-MIB by a single species, the balance among the benzene adsorption, the vitamin B12 adsorption, and the mesopore volume is important. As described later, in the present embodiment, a carbonaceous material having the above-mentioned characteristics was successfully produced by a specific production method using a fluidized bed furnace.

(Specific Surface Area)

The carbonaceous material preferably has a specific surface area in a range of 900 to 1500 m$^2$/g from the viewpoint of achieving adsorption removal performance required for a water purifier at a high level. The lower limit of the specific surface area is preferably 950 m$^2$/g or more or 1000 m$^2$/g or more, and the upper limit is preferably 1400 m$^2$/g or less or 1300 m$^2$/g or less.

The specific surface area of the carbonaceous material can be calculated from the nitrogen adsorption isotherm using the BET method. The measurement of the nitrogen adsorption isotherm and the calculation of the specific surface area can be performed by methods described in [Measurement of nitrogen adsorption isotherm] and [Measurement of specific surface area] described later.

(Average Pore Diameter)

From the viewpoint that trihalomethane and 2-MIB can be more efficiently removed by a single species, the carbonaceous material preferably has an average pore diameter in a range of 1.79 to 1.88 nm. The lower limit of the average pore diameter is preferably 1.80 nm or more, and the upper limit is preferably 1.87 nm or less or 1.86 nm or less.

The average pore diameter of the carbonaceous material can be calculated from the nitrogen adsorption isotherm. The measurement of the nitrogen adsorption isotherm and the calculation of the average pore diameter can be performed by methods described in [Measurement of nitrogen adsorption isotherm] and [Measurement of total pore volume and average pore diameter] described later.

(Ratio of Micropore Volume to Total Pore Volume (Micropore Ratio))

From the viewpoint that trihalomethane and 2-MIB can be more efficiently removed by a single species, the carbonaceous material preferably has a ratio (micropore ratio) of the micropore volume to a total pore volume of 96% or less. The ratio is more preferably 95% or less. The lower limit of the micropore ratio is not particularly limited, and is usually preferably 90% or more and preferably 92% or more from the viewpoint of achieving excellent trihalomethane adsorption performance.

The total pore volume of the carbonaceous material can be calculated from the nitrogen adsorption at a relative pressure P/P0=0.99 in the nitrogen adsorption isotherm, and the micropore volume can be calculated from the nitrogen adsorption isotherm using a MP (Micropore) method. The measurement of the nitrogen adsorption isotherm and the calculation of the total pore volume and the micropore volume o can be performed by methods described in [Measurement of nitrogen adsorption isotherm], [Measurement of total pore volume and average pore diameter], and [Measurement of micropore volume by MP method] described later.

(Electroconductivity)

The carbonaceous material according to the present embodiment preferably has an electroconductivity measured by powder resistance measurement at a load of 12 kN in a range of 5 to 12 S/cm. When the electroconductivity is in this range, specifically, when the carbonaceous material has a structure in which the electroconductivity is in the above range, the carbonaceous material can achieve the adsorption removal performance required for a water purifier at a high level. The upper limit of the electroconductivity is preferably 11 S/cm or less, 10 S/cm or less, or 9 S/cm or less, and the lower limit is preferably 5.5 S/cm or more, 6 S/cm or more, or 6.5 S/cm or more.

The electroconductivity of the carbonaceous material can be measured by a method described in [Measurement of electroconductivity] described later.

The shape of the carbonaceous material is not particularly limited, may be, for example, any shape such as a particulate shape or a fibrous shape (thread-like, woven cloth-like, felt-like), and can be appropriately selected according to a specific use mode; however, the particulate shape is preferable because the adsorption performance per unit volume is high. In the case of a particulate carbonaceous material, the dimension thereof is not particularly limited, and the particle size and the like may be appropriately adjusted according to the specific use mode.

A raw material (carbonaceous precursor) of the carbonaceous material is not particularly limited. Examples of the carbonaceous precursor include plant-based carbonaceous precursors (for example, plant-derived materials such as wood, sawdust, charcoal, fruit shells such as coconut shells and walnut shells, fruit seeds, pulp production by-products, lignin, and waste molasses), mineral-based carbonaceous precursors (for example, mineral-derived materials such as peat, lignite, brown coal, bituminous coal, anthracite, coke, coal tar, coal pitch, petroleum distillation residues, and petroleum pitch), synthetic resin-based carbonaceous precursors (for example, materials derived from synthetic resins such as a phenol resin, polyvinylidene chloride, and an acrylic resin), and natural fiber-based carbonaceous precursors (for example, materials derived from natural fibers such as natural fibers such as cellulose and regenerated fibers such as rayon). Among them, the plant-based carbonaceous precursor is preferable because it is easy to obtain a carbonaceous material having excellent adsorption performance for the removal target substance specified in the Household Goods Quality Labeling Act. Thus, in a preferred embodiment, the carbonaceous material is derived from the plant-based carbonaceous precursor. From the viewpoint of achieving a carbonaceous material capable of more efficiently removing trihalomethane and 2-MIB, a coconut shell is preferably used as a raw material. Thus, in a particularly preferred embodiment, the coconut shell is used as the plant-based carbonaceous precursor.

The carbonaceous material according to the present embodiment can efficiently remove both of 2-MIB having a large molecular size and VOC such as trihalomethane having a small molecular size with the carbonaceous material alone. Therefore, the carbonaceous material of the present embodiment can be suitably used as a carbonaceous material for purifying water (carbonaceous material for water purification), and can be more suitably used as a carbonaceous material for purifying tap water (carbonaceous material for tap water purification).

[Method for Producing Carbonaceous Material]

The carbonaceous material according to one embodiment of the present invention is produced by activating the carbonaceous precursor described above. When carbonization is required prior to activation, oxygen or air is usually blocked, and carbonization may be performed at, for example, 400 to 800° C. (preferably 500 to 800° C., more preferably 550 to 750° C.). In this case, the carbonaceous material is produced by activating a raw material carbon obtained by carbonizing the carbonaceous precursor.

In order to achieve a carbonaceous material in which the benzene adsorption, the vitamin B12 adsorption, and the mesopore volume are in specific ranges, the activation method is important. The method for producing a carbonaceous material (hereinafter, also simply referred to as the "production method of the present embodiment") according to the present embodiment is characterized in that a fluidized bed furnace (fluidized bed activation furnace) is used as an activation furnace, and an oxygen-containing gas is introduced into the fluidized bed furnace separately from a fluidized gas introduced from a furnace bottom. As a result, it is possible to achieve the carbonaceous material which has a benzene adsorption of 25 to 40% and a vitamin B12 adsorption of 13.0 to 50.0 mg/g, while having a pore volume of mesopores of 0.070 to 0.150 cm$^3$/g as calculated from the nitrogen adsorption isotherm by means of the BJH method and has been difficult to achieve by a conventional method using a rotary kiln as an activation furnace or a conventional method in which a fluidized gas is exclusively introduced into a fluidized bed furnace from a furnace bottom.

The fluidized gas is not particularly limited as long as it has an action of fluidizing and activating the raw material carbon, and a conventionally known fluidized gas may be used. From the industrial point of view, a combustion gas of hydrocarbon (for example, light gases such as methane, propane, and butane, and liquid fuels such as light oil, kerosene, and heavy oil) is preferably used because the combustion gas contains water vapor and carbon dioxide suitably.

From the viewpoint of efficiently activating the raw material carbon, a water vapor concentration in the fluidized gas is preferably 10 to 40 vol %. The upper limit is more preferably 35 vol % or less or 30 vol % or less, and the lower limit is more preferably 12 vol % or more, 14 vol % or more, or 15 vol % or more.

In the production method of the present embodiment, the oxygen-containing gas is introduced into the fluidized bed furnace separately from the fluidized gas introduced from the furnace bottom. The oxygen-containing gas is introduced into the fluidized bed furnace so that an oxygen concentration in a gas obtained by adding the fluidized gas and the oxygen-containing gas is 0.004 to 1 vol %. From the viewpoint of obtaining a carbonaceous material capable of more efficiently removing trihalomethane and 2-MIB by a single species, the oxygen concentration in the gas obtained by adding the fluidized gas and the oxygen-containing gas is preferably 0.005 vol % or more, 0.01 vol % or more, 0.02 vol % or more, 0.03 vol % or more, 0.04 vol % or more, or 0.05 vol % or more. The upper limit of the oxygen concentration is preferably 0.95 vol % or less, 0.9 vol % or less, 0.85 vol % or less, or 0.8 vol % or less. In the present embodiment, the oxygen concentration in the gas obtained by adding the fluidized gas and the oxygen-containing gas is a concentration in terms of charge calculated based on the composition and introduction amount of the fluidized gas and the composition and introduction amount of the oxygen-containing gas.

The oxygen-containing gas is not particularly limited as long as it contains oxygen, and for example, air and a gas obtained by diluting air with another gas (for example, inert gas such as nitrogen) can be used. The oxygen concentration in the oxygen-containing gas is not particularly limited as long as the oxygen concentration in the gas obtained by adding the fluidized gas and the oxygen-containing gas is in the range of 0.004 to 1 vol %, and is preferably 20 vol % or less, more preferably 15 vol % or less, 10 vol % or less, 8 vol % or less, 6 vol % or less, 5 vol % or less, 4 vol % or less, 3 vol % or less, or 2 vol % or less. The lower limit of the oxygen concentration in the oxygen-containing gas can be usually 0.1 vol % or more, 0.2 vol % or more, or the like. Although oxygen may be contained in the fluidized gas introduced from the furnace bottom, when a combustion gas is used as the fluidized gas, it is generally difficult to control a low level of oxygen concentration in the combustion gas, and therefore, it is preferable to control the oxygen concentration by oxygen derived from the oxygen-containing gas.

Hereinafter, the production method of the present embodiment will be described with reference to the drawings. Main reference signs in drawings are as follows: 1 fluidized gas inlet, 2 oxygen-containing gas inlet, 3 gas outlet, 4 gas dispersion layer, 5 raw material carbon, 6 raw material carbon (during fluidization activation), 7 fluidized gas, 8 oxygen-containing gas, 9 exhaust gas, 10 gas dispersion portion, 20 fluidized bed portion, and 100 fluidized bed furnace (fluidized bed activation furnace).

FIG. 1 shows a schematic view of the fluidized bed furnace (fluidized bed activation furnace) 100 used in the production method of the present embodiment. The fluidized bed furnace 100 includes the fluidized gas inlet 1, the oxygen-containing gas inlet 2, the gas outlet 3, and the gas dispersion layer 4. The fluidized gas inlet 1 is generally disposed in a furnace bottom, and a fluidized gas (not shown) introduced into the fluidized bed furnace 100 passes through the gas dispersion layer 4, comes into contact with the raw material carbon 5, and is subjected to fluidization and activation of the raw material carbon. The fluidized gas is then discharged out of the furnace from the gas outlet 3 generally disposed in a furnace ceiling. In FIG. 1, a flow main direction (that is, flow direction from the furnace bottom to the furnace ceiling) of the fluidized gas is represented as a direction Z.

The gas dispersion layer 4 is not particularly limited as long as it has a function of dispersing the flow of the fluidized gas introduced from the fluidized gas inlet 1 and uniformly bringing the fluidized gas into contact with the raw material carbon 5, and a conventionally known gas dispersion layer may be used. For example, when the fluidized gas is dispersed using a perforated plate, a gas dispersion layer including a buffer region from the furnace bottom to the perforated plate is referred to as the gas dispersion layer 4. As shown in FIG. 1, the gas dispersion layer 4 is disposed on an upstream side in the fluidized bed furnace as viewed in the flow main direction Z of the fluidized gas. In the present embodiment, a region including the gas dispersion layer 4 is referred to as the gas dispersion portion 10. Therefore, the fluidized bed furnace 100 includes the gas dispersion portion 10 on the upstream side in the fluidized bed furnace as viewed in the flow main direction Z of the fluidized gas.

The fluidized bed furnace 100 also includes the fluidized bed portion 20 on an upstream side in the fluidized bed furnace as viewed in the flow main direction Z of the fluidized gas. In the fluidized bed portion 20, the raw material carbon 5 and the fluidized gas come into contact with each other to fluidize and activate the raw material carbon 5.

As described above, the production method of the present embodiment is characterized in that the oxygen-containing gas is introduced into the fluidized bed furnace separately from the fluidized gas introduced from the furnace bottom. In order to achieve the carbonaceous material in which the benzene adsorption, the vitamin B12 adsorption, and the mesopore volume are in the specific ranges, an introduction position of the oxygen-containing gas is important. That is, assuming that an upstream end position of the gas dispersion portion in the flow main direction Z of the fluidized gas is 0 (m), a downstream end position is $t1$ (m) ($t1>0$), and a position at which the oxygen-containing gas is introduced is $t2$ (m), it is preferable to satisfy an equation of $0.5\ t1 \leq t2$. When $0.5\ t1 > t2$, it is difficult to achieve the carbonaceous material according to the present embodiment in which the benzene adsorption, the vitamin B12 adsorption, and the mesopore volume are in specific ranges. Preferred is $0.7\ t1 \leq t2$, more preferred is $0.8\ t1 \leq t2$, $0.9\ t1 \leq t2$, or $t1 \leq t2$, and particularly preferred is $t1 < t2$, $1.2\ t1 \leq t2$, $1.4\ t1 \leq t2$, or $1.5\ t1 \leq t2$. The upper limit of $t2$ is not particularly limited as long as the oxygen-containing gas can come into contact with the raw material carbon being fluidized and activated and may be any position up to the furnace ceiling. However, when a height (thickness) of the fluidized bed portion 20 as viewed in the direction Z is $T$ (m) (that is, $T=$(furnace ceiling height−$t1$)), it is preferable that $t2 \leq 0.8T$, $t2 \leq 0.7T$, $t2 \leq 0.6T$, or $t2 \leq 0.5T$. When the oxygen-containing gas inlet 2 has a width (thickness) as viewed in the direction Z, the introduction position $t2$ of the oxygen-containing gas refers to a center position of the width (thickness).

Figure 2:
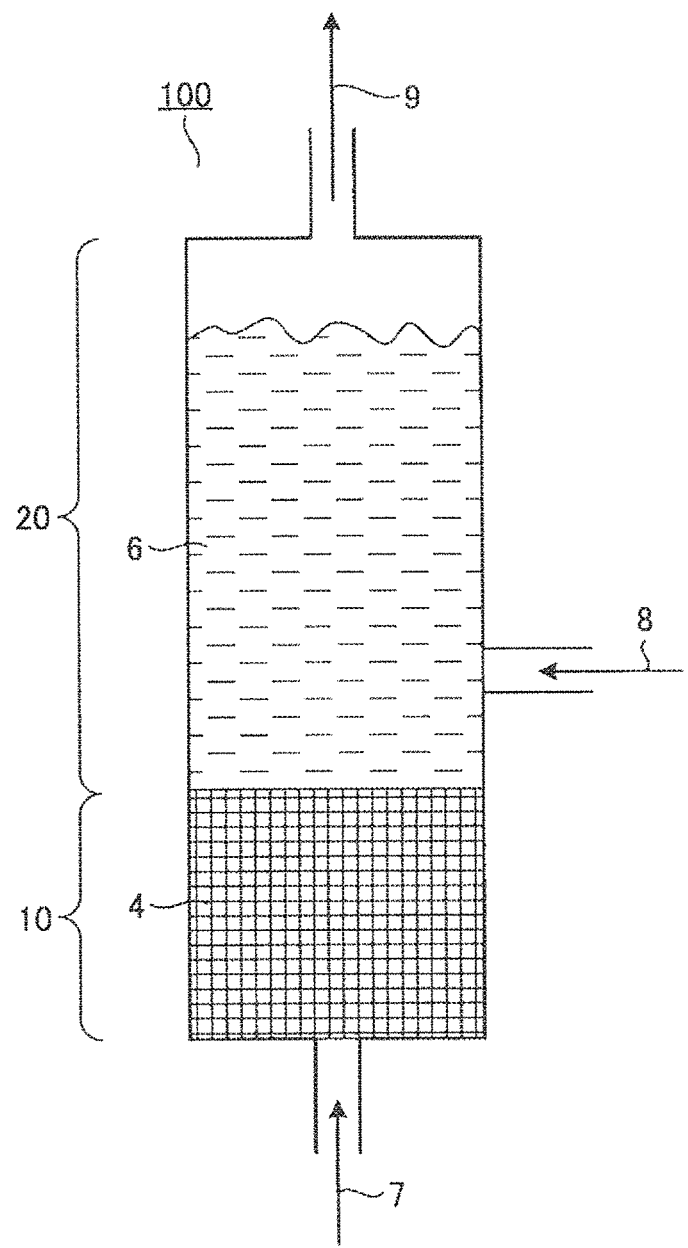
FIG. 2 is a schematic view for describing the method for producing a carbonaceous material using the fluidized bed furnace in the embodiment of the present invention.

FIG. 2 is a schematic view showing a state in which the raw material carbon is fluidized and activated using the fluidized bed furnace shown in FIG. 1. In FIG. 2, members and portions denoted by the same reference numerals as in FIG. 1 represent the same members and portions as in FIG. 1.

In FIG. 2, the fluidized gas 7 is introduced into the fluidized bed furnace 100 from the furnace bottom, and the oxygen-containing gas 8 is introduced into the fluidized bed furnace 100 from a furnace side. The fluidized gas 7 passes through the gas dispersion portion 10 formed of the gas dispersion layer 4, comes into contact with the raw material carbon in the fluidized bed portion 20, and is used for fluidization and activation of the raw material carbon. The oxygen-containing gas 8 (specifically, oxygen in gas) comes into contact with the raw material carbon 6 being fluidized and activated and is used for local activation of the raw material carbon. It is presumed that such local activation of the raw material carbon by the oxygen-containing gas makes it possible to locally develop mesopores while maintaining micropores, so that the carbonaceous material in which the benzene adsorption, the vitamin B12 adsorption, and the mesopore volume are in the specific ranges is advantageously produced.

As conditions for the activation of the raw material carbon, conventionally known conditions may be employed except that the oxygen-containing gas is introduced separately from the fluidized gas. For example, a temperature at the time of activation may be 700 to 1000° C. (preferably 800 to 1000° C., 850 to 950° C.), and the time of activation may be any time during which an expected benzene adsorption (an expected degree of progress of activation) is achieved.

In the production method of the present embodiment, it is as described above that an expected carbonaceous material in which the benzene adsorption, the vitamin B12 adsorption, and the mesopore volume are in the specific ranges can be produced by an action of the oxygen-containing gas introduced separately from the fluidized gas. Here, while the activation of the raw material carbon by water vapor or carbon dioxide in the fluidized gas is an endothermic reaction, the activation of the raw material carbon by oxygen in the oxygen-containing gas is a rapid exothermic reaction. Therefore, in the production method of the present embodiment in which the oxygen-containing gas is brought into contact with the raw material carbon being fluidized and activated, a heat supply from the outside required for maintaining the activation of the raw material carbon can be reduced, which is extremely advantageous also from the viewpoint of energy balance.

After being subjected to the activation of the raw material carbon, the fluidized gas 7 and the oxygen-containing gas 8 are discharged to the outside of the furnace through the gas outlet (exhaust gas 9 in FIG. 2). Thermal energy of the exhaust gas may be reused by circulating some or all of the exhaust gas or exchanging heat.

Although FIGS. 1 and 2 show the fluidized bed furnace including one fluidized gas inlet 1, one oxygen-containing gas inlet 2, and one gas outlet 3, FIGS. 1 and 2 are merely schematic views, and the fluidized bed furnace may include a plurality of the fluidized gas inlets 1, a plurality of the oxygen-containing gas inlets 2, and a plurality of the gas outlets 3. When a plurality of oxygen-containing gas inlets 2 are provided, the oxygen-containing gas inlets 2 may be arranged at the same position (height) as viewed in the flow main direction Z of the fluidized gas, or may be arranged at different positions (heights).

When a plant-based carbonaceous precursor such as coconut shell or a mineral-based carbonaceous precursor containing impurities such as alkali metal, alkaline earth metal, and transition metal is used, the carbonaceous material after activation is washed to remove ash and chemicals. Therefore, in one embodiment, the production method of the present invention may include a step of washing the carbonaceous material after activation. In that case, a mineral acid or water is used for washing, and hydrochloric acid having high washing efficiency is preferable as the mineral acid. In the case of washing (pickling) the carbonaceous material using a mineral acid such as hydrochloric acid, it is preferable to perform deacidification treatment by performing water washing or the like after pickling.

After washing, the obtained carbonaceous material is dried, and pulverized and sieved as necessary, whereby a carbonaceous material product can be obtained.

[Filter for Water Purification]

A filter for water purification can be manufactured using a carbonaceous material. Hereinafter, a filter for water purification according to a preferred embodiment will be described.

In a preferred embodiment, the filter for water purification contains the carbonaceous material and the fibrous binder according to the present embodiment as described above.

The fibrous binder is not particularly limited as long as it can be fibrillated to entangle and shape the carbonaceous material, and can be widely used regardless of synthetic products and natural products. Examples of such a fibrous binder include acrylic fibers, polyethylene fibers, polypropylene fibers, polyacrylonitrile fibers, cellulose fibers, nylon fibers, aramid fibers, and pulp. A fiber length of the fibrous binder is preferably 4 mm or less.

Two or more kinds of the fibrous binders may be used in combination. It is particularly preferred to use polyacrylonitrile fibers or pulp as a binder. Accordingly, it is possible to further increase a molded body density and molded body strength and to suppress deterioration in performance.

In a preferred embodiment, water permeability of the fibrous binder is about 10 to 150 mL in terms of CSF value. In the present embodiment, the CSF value is a value measured in accordance with Canadian standard freeness of JIS P 8121 "Pulps-Determination of drainability". The CSF value can be adjusted, for example, by fibrillating the fibrous binder. When the CSF value of the fibrous binder is less than 10 mL, the water permeability cannot be obtained, the molded body strength decreases, and pressure loss may also increase. On the other hand, when the CSF value exceeds 150 mL, a powdered activated carbon cannot be sufficiently held, the molded body strength decreases, and, in addition, the adsorption performance may be poor.

The filter for water purification preferably contains 4 to 10 parts by mass and more preferably 4.5 to 6 parts by mass of the fibrous binder relative to 100 parts by mass of the carbonaceous material from viewpoints of removal performance of the removal target substance, moldability, and the like. Therefore, in a preferred embodiment, the filter for water purification contains the carbonaceous material and the fibrous binder according to the present embodiment, the CSF value of the fibrous binder is 10 to 150 mL, and 4 to 10 parts by mass of the fibrous binder is contained relative to 100 parts by mass of the carbonaceous material. When the filter for water purification contains other functional components to be described later, "relative to 100 parts by mass of the carbonaceous material" denoting a filter composition may be read as "relative to 100 parts by mass of the total of the carbonaceous material and other functional components" and applied.

The filter for water purification may contain other functional components as long as the effect of the present invention is not inhibited. Examples of other functional components include lead adsorbents such as titanosilicate and a zeolite-based powder capable of adsorbing and removing soluble lead, an ion exchange resin, a chelating resin, and various adsorbents containing silver ions and/or a silver compound for imparting antibacterial properties.

The filter for water purification according to the present embodiment contains the carbonaceous material according to the present embodiment and therefore can efficiently remove both of 2-MIB having a large molecular size and VOC such as trihalomethane having a small molecular size. The water passing condition is not particularly limited, and is carried out at a space velocity (SV) of 300 to 6500/hr such that the pressure loss is not excessively increased. Performance of the filter for water purification can be confirmed by plotting a relationship between each removal rate calculated from the concentration of the removal target substance in raw water and permeated water and a ratio (cumulative amount of permeated water L/mL) of an amount of water (L) that has flowed since the beginning of water flow to a volume (mL) of a water purification cartridge.

[Water Purifier]

A water purifier can be manufactured using a carbonaceous material or a filter for water purification. In a preferred embodiment, the water purifier contains the carbonaceous material or the filter for water purification according to the present embodiment as described above.

In a preferred embodiment, the water purifier includes a cartridge for water purification, and the cartridge for water purification is configured using the carbonaceous material or the filter for water purification according to the present embodiment. For example, the carbonaceous material according to the present embodiment may be filled in a housing to constitute a cartridge for water purification, and the filter for water purification according to the present embodiment may be filled in the housing to constitute the cartridge for water purification. The cartridge for water purification may include, in addition to the carbonaceous material or the filter for water purification according to the present embodiment, a combination of known nonwoven fabric filters, various adsorbents, mineral additives, ceramic filtration materials, hollow yarn films, and the like.

The present specification discloses various technical aspects as mentioned above. Among them, major techniques will be summarized as follows.

The carbonaceous material according to one aspect of the present invention has a benzene adsorption of 25 to 40% and a vitamin B12 adsorption of 13.0 to 50.0 mg/g, while having a pore volume of mesopores of 0.070 to 0.150 cm$^3$/g as calculated from the nitrogen adsorption isotherm by means of the BJH method.

With such a configuration, it is possible to provide a carbonaceous material capable of removing both trihalomethane and 2-MIB by a single species.

In the carbonaceous material, the specific surface area calculated from the nitrogen adsorption isotherm by means of a BET method is preferably 900 to 1500 m$^2$/g. Accordingly, it is considered that the adsorption removal performance required for the water purifier can be achieved at a high level.

In addition, in the carbonaceous material, the average pore diameter calculated from the nitrogen adsorption isotherm is preferably 1.79 to 1.88 nm. Accordingly, it is considered that trihalomethane and 2-MIB can be more efficiently removed by a single species.

In the carbonaceous material, a ratio of the micropore volume, calculated from the nitrogen adsorption isotherm by the MP method, to the total pore volume calculated from the nitrogen adsorption at a relative pressure P/P0=0.99 in the nitrogen adsorption isotherm is preferably 96% or less. Accordingly, it is considered that trihalomethane and 2-MIB can be more efficiently removed by a single species.

In addition, in the carbonaceous material, the electroconductivity measured by the powder resistance measurement at a load of 12 kN is preferably 5 to 12 S/cm. Accordingly, it is considered that the adsorption removal performance required for the water purifier can be achieved at a high level.

The carbonaceous material is preferably derived from a plant-based carbonaceous precursor. As a result, it is considered that it is easy to obtain a carbonaceous material having excellent adsorption performance for the removal target substance specified in the Household Goods Quality Labeling Act. In addition, it is considered that the plant-based carbonaceous precursor is preferably coconut shell, whereby the carbonaceous material capable of more efficiently removing trihalomethane and 2-MIB can be achieved.

The method for producing a carbonaceous material according to another aspect of the present invention uses a fluidized bed furnace, and in this production method, separately from a fluidized gas introduced from a furnace bottom, an oxygen-containing gas is introduced into the fluidized bed furnace so that an oxygen concentration in a gas obtained by adding the fluidized gas and the oxygen-containing gas is 0.004 to 1 vol %. With such a configuration, an excellent carbonaceous material as described above can be obtained.

In the production method, the water vapor concentration in the fluidized gas introduced from the furnace bottom is preferably 10 to 40 vol %. Accordingly, it is considered that the raw material carbon can be efficiently activated.

In addition, in the production method, it is preferable that the fluidized bed furnace includes the gas dispersion portion on the upstream side in the fluidized bed furnace as viewed in the flow main direction Z of the fluidized gas, and when the upstream end position of the gas dispersion portion in the direction Z is 0 (m), the downstream end position is t1 (m), and the position at which the oxygen-containing gas is introduced is t2 (m), the oxygen-containing gas is introduced so that the equation of 0.5 t1≤t2 is satisfied. Accordingly, it is considered that an excellent carbonaceous material as described above can be more reliably obtained.

In the filter for water purification according to still another aspect of the present invention, the carbonaceous material and the fibrous binder as described above are contained, the CSF value of the fibrous binder is 10 to 150 mL, and 4 to 10 parts by mass of the fibrous binder is contained relative to 100 parts by mass of the carbonaceous material. The present invention also includes a water purifier including the carbonaceous material as described above; and a water purifier including the filter for water purification.

EXAMPLES

Hereafter, the present invention will be more specifically described by way of Examples; however, the present invention is by no means limited to the Examples.

Evaluation Method

Physical property values in Examples were measured by the following methods.

[Measurement of Benzene Adsorption]

The carbonaceous materials prepared in Examples and Comparative Examples were dried in a constant temperature dryer at 115° C. for 3 hours, and then cooled to room temperature in a desiccator using silica gel as a desiccant. Next, in a thermostatic chamber at 20° C., dry air containing benzene having a concentration of ⅒ of a saturation concentration was caused to pass through the carbonaceous material. From the mass of the carbonaceous material that reached adsorption equilibrium and the mass of the carbonaceous material before adsorption (that is, the mass of the carbonaceous material after drying and cooling), the benzene adsorption (% by mass) was determined according to the following formula (1).

Benzene adsorption (% by mass)=[{(sample mass after benzene adsorption)−(sample mass before benzene adsorption)}/(sample mass before benzene adsorption)]×100      [Formula (1)]

[Measurement of Vitamin B12 Adsorption]

The carbonaceous materials prepared in Examples and Comparative Examples were pulverized so that a 50% particle diameter (D50) of a volume-based cumulative distribution of the carbonaceous material was about 9 to 11 μm, dried in a constant temperature dryer at 115° C. for 3 hours, and then cooled to room temperature in a desiccator using silica gel as a desiccant. The particle diameter of the pulverized carbonaceous material was measured by a laser diffraction measurement method. That is, a carbonaceous material to be measured was placed in ion-exchanged water together with a surfactant, and subjected to ultrasonic vibration to prepare a uniform dispersion, and measurement was performed using Microtrac MT3200 manufactured by Microtrac BEL Corp. As the surfactant, "polyoxyethylene (10) octylphenyl ether" manufactured by FUJIFILM Wako Pure Chemical Corporation was used. The analysis conditions are shown below.

(Analysis Conditions)
Number of measurements: once
Measurement time: 30 seconds
Distribution representation: volume
Particle size division: standard
Calculation mode: MT 3000
Solvent name: WATER
Measurement upper limit: 1408 μm, measurement lower limit: 0.265 μm
Residual fraction ratio: 0.00
Passing fraction ratio: 0.00
Residual fraction ratio setting: invalid
Particle transmittance: transmission
Particle refractive index: 1.81
Particle shape: non-spherical
Solvent refractive index: 1.333
DV value: 0.0100 to 0.0500
Transmittance (TFR): 0.750 to 0.920
Flow rate: 50%

To about 0.05 g to 0.30 g of the carbonaceous material obtained, 100 mL of an aqueous solution of vitamin B12 ($C_{63}H_{88}N_{14}O_{14}PCo$: molecular weight 1355.4) adjusted to about 320 ppm was added, the mixture was shaken at 25° C. at 160 times/min for 2 hours to adsorb vitamin B12, and the carbonaceous material was filtered to recover a filtrate. For about 320 ppm of vitamin B12 test water before adsorption used in an adsorption test and a vitamin B12 filtrate after adsorption treatment, an absorbance at 330 nm was measured, and a concentration of vitamin B12 was calculated based on a calibration curve prepared in advance. From the obtained concentration of vitamin B12, the vitamin B12 adsorption per 1 g of the carbonaceous material was calculated by the following formula (2).

Vitamin B12 adsorption (mg/g)={vitamin B12 concentration (ppm) before adsorption−vitamin B12 concentration (ppm) after adsorption treatment}×0.1/mass (g) of carbonaceous material  [Formula (2)]

The vitamin B12 adsorptions at a concentration where the concentration of vitamin B12 after the adsorption treatment was more than 300 ppm and at a concentration where the concentration of vitamin B12 after the adsorption treatment was less than 300 ppm were calculated. Then, the vitamin B12 adsorption after the adsorption treatment when the concentration of vitamin B12 after the adsorption treatment was 300 ppm was calculated by a power approximate expression, and taken as the vitamin B12 adsorption.

[Measurement of Nitrogen Adsorption Isotherm]

Using BELSORP-mini manufactured by Microtrac BEL Corp., the carbonaceous material was heated at 300° C. for 3 hours under a nitrogen stream (nitrogen flow rate: 50 mL/min), and then a nitrogen adsorption/desorption isotherm of the carbonaceous material at 77K was measured.

[Measurement of Specific Surface Area]

Analysis using a multipoint method was performed by the BET method from the nitrogen adsorption isotherm obtained by the above method, and the specific surface area was calculated from a straight line in a region of a relative pressure P/P0=0.01 to 0.1 of an obtained curve.

[Measurement of Total Pore Volume and Average Pore Diameter]

The total pore volume was calculated by the Gurvish method from the nitrogen adsorption at a relative pressure P/P0=0.99 in the nitrogen adsorption isotherm obtained by the above method. The average pore diameter was calculated based on the following formula (3) from the total pore volume and the specific surface area obtained by the BET method described above.

Average pore diameter (nm)=total pore volume ($cm^3$/g)/specific surface area ($m^2$/g)×4000  [Formula (3)]

[Measurement of Micropore Volume and Micropore Ratio by MP Method]

The MP method was applied to the nitrogen adsorption isotherm obtained by the above method to calculate the micropore volume. The ratio of the micropore volume obtained by the MP method to the total pore volume calculated by the above method was defined as the micropore ratio. In the analysis by the MP method, a reference curve "NGCB-BEL.t" provided by Microtrac BEL Corp. was used.

[Measurement of Pore Volume of Mesopores by BJH Method]

The BJH method was applied to the nitrogen adsorption isotherm obtained by the above method to calculate the pore volume of mesopores. In the analysis by the BJH method, the reference curve "NGCB-BEL.t" provided by Microtrac BEL Corp. was used.

[Measurement of Electroconductivity]

The electroconductivity of the carbonaceous material was measured using a powder resistivity measurement unit (MCP-PD51, manufactured by Mitsubishi Chemical Analytech). In the measurement of the electroconductivity, since the particle diameter of a measurement sample greatly affects the measurement, the electroconductivity of a carbonaceous material pellet was measured when the carbonaceous material was pulverized so that the 50% particle diameter (D50) of the volume-based cumulative distribution of the carbonaceous material was about 5 to 8 μm and a load of 12 kN was applied. The particle diameter of the pulverized carbonaceous material was measured by a laser diffraction measurement method. The measurement procedure and analysis conditions of the particle diameter of the carbonaceous material are as described above in [Measurement of vitamin B12 adsorption].

Example 1

The particle size of coconut shell carbon obtained by carbonizing coconut shell from the Philippines was adjusted from 10 mesh (1.7 mm) to 30 mesh (0.5 mm). 1 kg of the coconut shell carbon was put into a fluidized activation furnace heated to 900° C., 50 L/min of a fluidized gas containing 15 vol % of water vapor and 11 vol % of carbon dioxide was introduced from the furnace bottom, 5 L/min of an oxygen-containing gas containing 0.5 vol % of oxygen and 99.5 vol % of nitrogen was introduced from the furnace side, and activation treatment was performed until the benzene adsorption reached about 35% by weight (the oxygen concentration in a total gas introduced into the fluidized activation furnace was about 0.045 vol %). As the fluidized activation furnace, a furnace provided with a gas dispersion layer on the upstream side in the furnace as viewed in the flow main direction Z of the fluidized gas was used. The introduction position t2 of the oxygen-containing gas in the direction Z and the downstream end t1 of the gas dispersion layer satisfied an equation of t1<t2. That is, the oxygen-containing gas was introduced into the fluidized bottom portion of the fluidized activation furnace.

The obtained activated carbon was washed with dilute hydrochloric acid, then sufficiently washed with ion-exchanged water in order to remove residual hydrochloric acid, and dried to obtain a carbonaceous material. The treatment condition and the physical property values of the obtained carbonaceous material are shown in Table 1.

Example 2

The carbonaceous material was obtained in the same manner as in Example 1 except that the particle size of the coconut shell carbon before the activation treatment was adjusted from 30 mesh (0.5 mm) to 60 mesh (0.25 mm). The treatment condition and the physical property values of the obtained carbonaceous material are shown in Table 1.

Example 3

The carbonaceous material was obtained in the same manner as in Example 2 except that the concentration of the oxygen-containing gas introduced during the activation treatment was changed to 0.05 vol % of oxygen and 99.95 vol % of nitrogen. The treatment condition and the physical property values of the obtained carbonaceous material are shown in Table 1.

Example 4

The carbonaceous material was obtained in the same manner as in Example 2 except that the concentration of the oxygen-containing gas introduced during the activation treatment was changed to 1 vol % of oxygen and 99 vol % of nitrogen. The treatment condition and the physical property values of the obtained carbonaceous material are shown in Table 1.

Example 5

The carbonaceous material was obtained in the same manner as in Example 2 except that the concentration of the oxygen-containing gas introduced during the activation treatment was changed to 5 vol % of oxygen and 95 vol % of nitrogen. The treatment condition and the physical property values of the obtained carbonaceous material are shown in Table 1.

Example 6

The carbonaceous material was obtained in the same manner as in Example 2 except that the concentration of the oxygen-containing gas introduced during the activation treatment was changed to 10 vol % of oxygen and 90 vol % of nitrogen. The treatment condition and the physical property values of the obtained carbonaceous material are shown in Table 1.

Example 7

The carbonaceous material was obtained in the same manner as in Example 4 except that the activation treatment was performed until the benzene adsorption of the activated carbon reached about 28% by weight. The treatment condition and the physical property values of the obtained carbonaceous material are shown in Table 1.

Example 8

The carbonaceous material was obtained in the same manner as in Example 1 except that the particle size of the coconut shell carbon before the activation treatment was adjusted from 50 mesh (0.3 mm) to 100 mesh (0.15 mm). The treatment condition and the physical property values of the obtained carbonaceous material are shown in Table 1.

Comparative Example 1

The particle size of coconut shell carbon obtained by carbonizing coconut shell from the Philippines was adjusted from 10 mesh (1.7 mm) to 30 mesh (0.5 mm). 1 kg of this coconut shell carbon was put into a rotary kiln heated to 900° C., 10 L/min of an activation gas containing 15 vol % of water vapor and 11 vol % of carbon dioxide and 1 L/min of an additional gas containing 0.5 vol % of oxygen and 99.5 vol % of nitrogen were introduced, and the activation treatment was performed until the benzene adsorption reached about 35% by weight.

The obtained activated carbon was washed with dilute hydrochloric acid, then sufficiently washed with ion-exchanged water in order to remove residual hydrochloric acid, and dried to obtain a carbonaceous material. The treatment condition and the physical property values of the obtained carbonaceous material are shown in Table 1.

Comparative Example 2

The carbonaceous material was obtained in the same manner as in Comparative Example 1 except that the particle size of the coconut shell carbon before the activation treatment was adjusted from 30 mesh (0.5 mm) to 60 mesh (0.25 mm). The treatment condition and the physical property values of the obtained carbonaceous material are shown in Table 1.

Comparative Example 3 (Reference Example)

The carbonaceous material was obtained in the same manner as in Example 2 except that the activation treatment was performed until the benzene adsorption of the activated carbon reached about 45% by mass. The treatment condition and the physical property values of the obtained carbonaceous material are shown in Table 1. In Comparative Example 3, in the method for producing a carbonaceous material using a fluidized bed furnace, an oxygen-containing gas is supplied separately from a fluidized gas, and therefore, Comparative Example 3 is shown as a reference example, not an aspect according to the conventional technique. The same applies to Comparative Examples 4 and 6 described later.

Comparative Example 4 (Reference Example)

The carbonaceous material was obtained in the same manner as in Example 2 except that the activation treatment was performed until the benzene adsorption of the activated carbon reached about 25% by mass. The treatment condition and the physical property values of the obtained carbonaceous material are shown in Table 1.

Comparative Example 5

The carbonaceous material was obtained in the same manner as in Example 2 except that the oxygen-containing gas introduced during the activation treatment was changed to an oxygen-free nitrogen gas. The treatment condition and the physical property values of the obtained carbonaceous material are shown in Table 1.

Comparative Example 6 (Reference Example)

The carbonaceous material was obtained in the same manner as in Example 2 except that the oxygen-containing gas introduced during the activation treatment was changed to air. The treatment condition and the physical property values of the obtained carbonaceous material are shown in Table 1.

Comparative Example 7

The carbonaceous material was obtained in the same manner as in Comparative Example 2 except that the oxygen-containing gas introduced during the activation treatment was changed to an oxygen-free nitrogen gas. The treatment condition and the physical property values of the obtained carbonaceous material are shown in Table 1.

Comparative Example 8

The carbonaceous material was obtained in the same manner as in Comparative Example 2 except that the concentration of the oxygen-containing gas introduced during the activation treatment was changed to 1 vol % of oxygen and 99 vol % of nitrogen. The treatment condition and the physical property values of the obtained carbonaceous material are shown in Table 1.

Comparative Example 9

The carbonaceous material was obtained in the same manner as in Comparative Example 2 except that the concentration of the oxygen-containing gas introduced during the activation treatment was changed to 5 vol % of oxygen and 95 vol % of nitrogen. The treatment condition and the physical property values of the obtained carbonaceous material are shown in Table 1.

Comparative Example 10

The carbonaceous material was obtained in the same manner as in Comparative Example 2 except that the concentration of the oxygen-containing gas introduced during the activation treatment was changed to 10 vol % of oxygen and 90 vol % of nitrogen. The treatment condition and the physical property values of the obtained carbonaceous material are shown in Table 1.

Comparative Example 11

The carbonaceous material was obtained in the same manner as in Comparative Example 3 except that the oxygen-containing gas introduced during the activation treatment was changed to an oxygen-free nitrogen gas. The treatment condition and the physical property values of the obtained carbonaceous material are shown in Table 1.

Comparative Example 12

An activated carbon before pulverization of PGW-100MD manufactured by Kuraray Co., Ltd., which was a powdered activated carbon was obtained, and the particle size was adjusted from 30 mesh (0.5 mm) to 60 mesh (0.25 mm) to obtain the carbonaceous material of Comparative Example 12. The physical property values are shown in Table 1.

TABLE 1

| | Activation furnace | Particle size during activation mesh | Oxygen concentration in oxygen-containing gas vol. % | Oxygen concentration total gas vol. % | Benzene adsorption % | Vitamin B12 adsorption mg/g | Mesopore volume (BJH method) cm$^3$/g | Specific surface area m$^2$/g | Average pore diameter nm | Micropore ratio % | Electro conductivity S/cm | Micropore volume (MP method) cm$^3$/g |
|---|---|---|---|---|---|---|---|---|---|---|---|---|
| Example 1 | Fluidized bed furnace | 10-30 | 0.5 | 0.045 | 38.1 | 19.0 | 0.094 | 1248 | 1.82 | 94 | 6.6 | 0.53 |
| Example 2 | Fluidized bed furnace | 30-60 | 0.5 | 0.045 | 34.4 | 20.3 | 0.087 | 1172 | 1.79 | 94 | 7.8 | 0.50 |
| Example 3 | Fluidized bed furnace | 30-60 | 0.05 | 0.0045 | 34.4 | 18.4 | 0.072 | 1177 | 1.77 | 95 | 8.2 | 0.50 |
| Example 4 | Fluidized bed furnace | 30-60 | 1 | 0.091 | 35.2 | 21.0 | 0.098 | 1203 | 1.80 | 94 | 7.4 | 0.51 |
| Example 5 | Fluidized bed furnace | 30-60 | 5 | 0.45 | 34.4 | 23.1 | 0.105 | 1187 | 1.85 | 93 | 7.0 | 0.51 |
| Example 6 | Fluidized bed furnace | 30-60 | 10 | 0.91 | 35.4 | 74.7 | 0.135 | 1222 | 1.90 | 93 | 6.8 | 0.54 |
| Example 7 | Fluidized bed furnace | 30-60 | 1 | 0.091 | 28.5 | 14.8 | 0.081 | 989 | 1.84 | 92 | 8.1 | 0.42 |
| Example 8 | Fluidized bed furnace | 50-100 | 0.5 | 0.045 | 36.3 | 24.0 | 0.091 | 1209 | 1.85 | 95 | 7.3 | 0.53 |
| Comparative Example 1 | Rotary kiln | 10-30 | 0.5 | 0.045 | 34.7 | 10.1 | 0.069 | 1144 | 1.78 | 98 | 12.9 | 0.50 |
| Comparative Example 2 | Rotary kiln | 30-60 | 0.5 | 0.045 | 34.0 | 10.2 | 0.068 | 1139 | 1.78 | 98 | 12.9 | 0.50 |
| Coparative Example 3 | Fluidized bed furnace | 30-60 | 0.5 | 0.045 | 46.6 | 38.3 | 0.147 | 1571 | 1.88 | 92 | 6.5 | 0.68 |
| Comparative Example 4 | Fluidized bed furnace | 30-60 | 0.5 | 0.045 | 24.7 | 9.2 | 0.061 | 915 | 1.82 | 98 | 8.3 | 0.41 |

TABLE 1-continued

|  | Activation furnace | Particle size during activation mesh | Oxygen concentration in oxygen-containing gas vol. % | Oxygen concentration total gas vol. % | Benzene adsorption % | Vitamin B12 adsorption mg/g | Mesopore volume (BJH method) cm$^2$/g | Specific surface area m$^2$/g | Average pore diameter nm | Micropore ratio % | Electro conductivity S/cm | Micropore volume (MP method) cm$^2$/g |
|---|---|---|---|---|---|---|---|---|---|---|---|---|
| Comparative Example 5 | Fluidized bed furnace | 30-60 | 0 | 0 | 34.5 | 12.9 | 0.069 | 1163 | 1.79 | 96 | 8.2 | 0.50 |
| Comparative Example 6 | Fluidized bed furnace | 30-60 | 20 | 1.82 | 35.4 | 36.1 | 0.160 | 1168 | 2.16 | 84 | 5.3 | 0.53 |
| Comparative Example 7 | Rotary kiln | 30-60 | 0 | 0 | 35.2 | 9.1 | 0.066 | 1132 | 1.77 | 98 | 13.1 | 0.49 |
| Comparative Example 8 | Rotary kiln | 30-0 | 1 | 0.091 | 34.6 | 10.8 | 0.070 | 1149 | 1.78 | 96 | 12.4 | 0.49 |
| Comparative Example 9 | Rotary kiln | 30-60 | 5 | 0.45 | 34.6 | 11.3 | 0.077 | 1186 | 1.77 | 97 | 12.2 | 0.51 |
| Comparative Example 10 | Rotary kiln | 30-60 | 10 | 0.91 | 34.1 | 12.7 | 0.085 | 1173 | 1.77 | 96 | 12.1 | 0.50 |
| Comparative Example 11 | Fluidized bed furnace | 30-60 | 0 | 0 | 44.2 | 34.5 | 0.106 | 1472 | 1.80 | 94 | 6.9 | 0.62 |
| Comparative Example 12 | — | — | — | — | 30.7 | 10.0 | 0.049 | 1070 | 1.71 | 100 | 13.0 | 0.46 |

[Evaluation of Filterability of Carbonaceous Material]

A water purification cartridge having a diameter of 34 mm, a height of 67 mm, and an internal volume of 60 mL was filled with the carbonaceous material prepared in each of Examples 1 to 8 and Comparative Examples 1 to 12, and a filterability test for trihalomethane and 2-MIB was performed according to the following procedure in accordance with a household water purifier test method specified in JIS S 3201 (2010). The carbonaceous materials of Example 1 and Comparative Example 1 were subjected to the present test after particle size adjustment from 30 mesh (0.5 mm) to 60 mesh (0.25 mm).

[Total Trihalomethane Filterability Test]

Water adjusted to a chloroform concentration of 45±9 ppb, a bromodichloromethane concentration of 30±6 ppb, a dibromochloromethane concentration of 20±4 ppb, and a bromoform concentration of 5±1 ppb was used as test water, and under the conditions of 1 L/min and a space velocity (SV) of 1000 hr$^{-1}$, the filterability test was performed with a point at which the removal rate was less than 80% as a break point. In this test, samples having a filterability of 7.0 (L/mL) or more were evaluated as acceptable. Water flow test conditions and results are shown in Table 2.

[2-MIB Filterability Test]

Water adjusted to a 2-MIB concentration of 50±10 ppt was used as test water, and under the conditions of 1 L/min and a space velocity (SV) of 1000 hr$^{-1}$, the filterability test was performed with a point at which the removal rate was less than 80% as a break point. In this test, samples having a filterability of 30.0 (L/mL) or more were evaluated as acceptable. Water flow test conditions and results are shown in Table 2.

TABLE 2

|  | Particle size during water flow test mesh | Filling density g/mL | Filling volume mL | Space velocity (SV) hr$^{-1}$ | Total trihalomethane filterability L/mL | 2-MIB filterability L/mL |
|---|---|---|---|---|---|---|
| Example 1 | 30-60 | 0.480 | 60 | 1000 | 8.3 | 30.5 |
| Example 2 | 30-60 | 0.509 | 60 | 1000 | 8.5 | 37.0 |
| Example 3 | 30-60 | 0.514 | 60 | 1000 | 8.8 | 36.8 |
| Example 4 | 30-60 | 0.502 | 60 | 1000 | 8.3 | 39.2 |
| Example 5 | 30-60 | 0.497 | 60 | 1000 | 8.3 | 36.0 |
| Example 6 | 30-60 | 0.480 | 60 | 1000 | 7.8 | 37.2 |
| Example 7 | 30-60 | 0.520 | 60 | 1000 | 10.7 | 30.2 |
| Example 8 | 50-100 | 0.474 | 60 | 1000 | 14.8 | 77.5 |
| Comparative Example 1 | 30-60 | 0.473 | 60 | 1000 | 7.5 | 14.8 |
| Comparative Example 2 | 30-60 | 0.488 | 60 | 1000 | 8.0 | 18.3 |
| Comparative Example 3 | 30-60 | 0.461 | 60 | 1000 | 3.2 | 67.2 |
| Comparative Example 4 | 30-60 | 0.609 | 60 | 1000 | 13.0 | 18.7 |
| Comparative Example 5 | 30-60 | 0.511 | 60 | 1000 | 8.7 | 28.0 |
| Comparative Example 6 | 30-60 | 0.467 | 60 | 1000 | 6.8 | 35.5 |
| Comparative Example 7 | 30-60 | 0.488 | 60 | 1000 | 8.0 | 20.2 |
| Comparative Example 8 | 30-60 | 0.477 | 60 | 1000 | 8.0 | 19.2 |
| Comparative Example 9 | 30-60 | 0.459 | 60 | 1000 | 7.5 | 18.2 |
| Comparative Example 10 | 30-60 | 0.444 | 60 | 1000 | 7.5 | 17.2 |
| Comparative Example 11 | 30-60 | 0.472 | 60 | 1000 | 4.5 | 61.0 |
| Comparative Example 12 | 30-60 | 0.538 | 60 | 1000 | 9.3 | 16.8 |

(Consideration)

As is apparent from the results in Table 2, it was shown that all of the carbonaceous materials of Examples according to the present invention could remove both trihalomethane having a small molecular size and 2-MIB having a large molecular size.

On the other hand, in Comparative Examples 1 to 12 in which at least one of the benzene adsorption, the vitamin B12 adsorption, and/or the mesopore volume did not satisfy the requirements of the present invention, only one of trihalomethane and 2-MIB could be removed, and both of trihalomethane and 2-MIB could not be removed unlike the carbonaceous materials of Examples.

This application is based on Japanese Patent Application No. 2019-085514 filed in Japan Patent Office on Apr. 26, 2019, the contents of which are hereby incorporated by reference.

To describe the present invention, the invention has been described in the foregoing description appropriately and sufficiently using embodiments with reference to specific examples, drawings, and the like. However, it is to be understood that changes and/or modifications to the foregoing embodiments will readily occur to those skilled in the art. Therefore, unless a change or modification made by those skilled in the art is beyond the scope of the appended claims, such change or modification is to be embraced within the scope of the appended claims.

INDUSTRIAL APPLICABILITY

The carbonaceous material of the present invention is particularly useful for removing a removal target substance in the Household Goods Quality Labeling Act. Thus, the present invention has wide industrial applicability in water purification technologies such as a filter for water purification and a water purifier.

The invention claimed is:

1. A carbonaceous material having a benzene adsorption of 25 to 40%, a vitamin B12 adsorption of 13.0 to 50.0 mg/g, and a pore volume of mesopores of 0.070 to 0.150 cm$^3$/g as calculated from a nitrogen adsorption isotherm by means of a BJH method.

2. The carbonaceous material according to claim 1, wherein a specific surface area calculated from the nitrogen adsorption isotherm by means of a BET method is 900 to 1500 m$^2$/g.

3. The carbonaceous material according to claim 1, wherein an average pore diameter calculated from the nitrogen adsorption isotherm is 1.79 to 1.88 nm.

4. The carbonaceous material according to claim 1, wherein a ratio of a micropore volume, calculated from the nitrogen adsorption isotherm by an MP method, to a total pore volume calculated from a nitrogen adsorption at a relative pressure P/P0=0.99 in the nitrogen adsorption isotherm is 96% or less.

5. The carbonaceous material according to claim 1, wherein an electroconductivity measured by powder resistance measurement at a load of 12 kN is 5 to 12 S/cm.

6. The carbonaceous material according to claim 1, wherein said carbonaceous material is derived from a plant-based carbonaceous precursor.

7. The carbonaceous material according to claim 6, wherein the plant-based carbonaceous precursor is a coconut shell.

8. A method for producing the carbonaceous material of claim 1 using a fluidized bed furnace, the production method comprising:
separately from a fluidized gas introduced from a furnace bottom, introducing an oxygen-comprising gas into the fluidized bed furnace in such a way that an oxygen concentration in a gas obtained by adding the fluidized gas and the oxygen-comprising gas is 0.004 to 1 vol %.

9. The method for according to claim 8, wherein a water vapor concentration in the fluidized gas introduced from the furnace bottom is 10 to 40 vol %.

10. The method according to claim 8, wherein:
the fluidized bed furnace includes a gas dispersion portion on an upstream side in the fluidized bed furnace as viewed in a flow main direction Z of the fluidized gas; and
when an upstream end position of the gas dispersion portion in the direction Z is 0 (m), a downstream end position is t1 (m), and a position at which the oxygen-comprising gas is introduced is t2 (m), the oxygen-comprising gas is introduced in such a way that an equation of $0.5 \leq t1 \leq t2$ is satisfied.

11. A filter, comprising:
the carbonaceous material according to claim 1; and
a fibrous binder,
wherein a CSF value of the fibrous binder is 10 to 150 mL, and the filter comprises 4 to 10 parts by mass of the fibrous binder relative to 100 parts by mass of the carbonaceous material.

12. A water purifier, comprising the carbonaceous material according to claim 1.

13. A water purifier, comprising the filter according to claim 11.

14. The carbonaceous material according to claim 1, wherein the benzene adsorption is 29 to 36%, the vitamin B12 adsorption is 16.0 to 44.0 mg/g, and the pore volume of mesopores is 0.078 to 0.144 cm$^3$/g as calculated from a nitrogen adsorption isotherm by means of a BJH method.

15. The carbonaceous material according to claim 14, wherein a specific surface area calculated from the nitrogen adsorption isotherm by means of a BET method is 950 to 1400 m$^2$/g.

16. The carbonaceous material according to claim 14, wherein an average pore diameter calculated from the nitrogen adsorption isotherm is 1.80 to 1.87 nm.

17. The carbonaceous material according to claim 14, wherein a ratio of a micropore volume, calculated from the nitrogen adsorption isotherm by an MP method, to a total pore volume calculated from a nitrogen adsorption at a relative pressure P/P0=0.99 in the nitrogen adsorption isotherm is 95% or less.

18. The carbonaceous material according to claim 1, wherein an electroconductivity measured by powder resistance measurement at a load of 12 kN is 6 to 10 S/cm.

19. The carbonaceous material according to claim 4, wherein a ratio of a micropore volume, calculated from the nitrogen adsorption isotherm by an MP method, to a total pore volume calculated from a nitrogen adsorption at a relative pressure P/P0=0.99 in the nitrogen adsorption isotherm is 90%-96%.

20. The carbonaceous material according to claim 17, wherein a ratio of a micropore volume, calculated from the nitrogen adsorption isotherm by an MP method, to a total pore volume calculated from a nitrogen adsorption at a relative pressure P/P0=0.99 in the nitrogen adsorption isotherm is 90%-95%.

* * * * *